United States Patent Office 3,842,021
Patented Oct. 15, 1974

3,842,021
THERMOSETTING POLYESTER POWDER COATING COMPOSITIONS
Peter M. Grant, Robert B. Taylor, and Winston J. Jackson, Jr., Kingsport, Tenn., assignors to Eastman Kodak Company, Rochester, N.Y.
No Drawing. Filed Feb. 26, 1973, Ser. No. 335,872
Int. Cl. C08b 21/08; C08g 37/34
U.S. Cl. 260—15
10 Claims

ABSTRACT OF THE DISCLOSURE

Thermosetting powder coating compositions comprising a polyester derived from an acid component, at least 50 mole percent of which is terephthalic or isophthalic acid, a glycol component, at least 50 mole percent of which is neopentyl glycol, and from about 2 to about 10 mole percent of a polyol having at least 3 primary hydroxyl groups. The composition further comprises a crosslinking agent and a catalyst which allows the powder to flow out prior to fusion. The coating has excellent physical properties such as gloss, toughness, weatherability, etc.

---

This invention relates generally to thermosetting powder coating compositions, and more specifically to such compositions comprising a polyester as the main film-forming component.

Plastic materials for powder coatings are classified broadly as either thermosetting or thermoplastic. In the use of thermoplastic powder coatings, heat is applied to the coating on the substrate, thereby melting the particles of thermoplastic powder. The molten particles flow together and form a smooth coating prior to removal of heat, which allows the coating to cool and solidify.

Thermoplastic coatings, however, have several disadvantages compared to thermosetting coatings. Thermosetting coatings generally are tougher, more resistant to solvents, have better adhesion to metal substrates, and do not tend to soften when exposed to elevated temperatures. On the other hand, thermosetting powder coatings in the past have had a disadvantage in that they cure or set by the application of heat prior to the formation of a smooth coating, resulting in a relatively rough finish, such as the so-called "orange-peel" appearance, thus lacking the gloss and luster characteristics of thermoplastic powder coatings which are often desirable. This has resulted in thermosetting coatings usually being applied from organic solvent systems, which is not as desirable as powder coating systems because of the usual fire and health hazards, as well as cost.

It has now been found that when certain polyesters are modified with certain amounts, within a fairly narrow range, of a polyol containing at least 3 primary hydroxyl groups and mixed with conventional crosslinking agents such as aminoplasts, crosslinking will occur under curing conditions. Furthermore, powder compositions containing polyesters modified according to this invention unexpectedly resist caking at normal storage conditions of temperatures up to, say, 80° F. Powder coatings made from compositions containing the modified polyesters according to this invention are found to have excellent physical properties, such as good flow-out capability, good weatherability, resistance to heat, scuffing, moisture and solvents, hardness, flexibility, and excellent impact strength.

It is, therefore, an object of the present invention to provide a noncaking thermosetting powder coating composition which is friable and free-flowing at ambient conditions.

It is another object of this invention to provide a thermosetting powder coating composition which will flow out prior to curing or thermosetting to result in a smooth, glossy coating substantially free of the so-called "orange-peel" appearance.

It is a further object of this invention to provide a thermosetting powder coating composition having good weatherability and general physical characteristics.

Other objects of this invention will appear herein.

In accordance with this invention, a thermosetting powder coating composition having a particle size of from about 10 to about 300 microns is provided which comprises a polyester, a crosslinking agent, a special catalyst, and optionally a cellulose ester, a plasticizer, an antioxidant, and a pigment or dye. The polyester may be synthesized using conventional condensation polymerization techniques. The composition may be melt-compounded without causing crosslinking to occur and subsequently solidified and ground to a particle size suitable for forming thin coatings, or spray dried to achieve both compounding and powder.

The polyester component of the composition according to this invention is derived from:

(a) at least 50 mole percent, preferably at least 90 mole percent, isophthalic or terephthalic acid, or a mixture thereof. Up to 50 mole percent of other aromatic dicarboxylic acids, or up to about 10 mole percent of other aliphatic acids or mixtures thereof may be used. Suitable aliphatic dicarboxylic acids are those containing from 4 to 18 carbon atoms such as adipic acid, succinic acid, glutaric acid, sebacic acid, azelaic acid and the like. Also, other suitable aromatic dicarboxylic acids include 2,5- and 2,6-naphthalene dicarboxylic acids.

(b) at least 50 mole percent, preferably at least 75 mole percent, neopentyl glycol. Up to 50 mole percent of other glycols may be used. Several examples of other glycols include 2,2,4-trimethylpentanediol, 1,4-butanediol, ethylene glycol, and cyclohexanedimethanol.

(c) from about 2 mole percent to about 10 mole percent of a polyol having from 4 to 16 carbon atoms and containing at least 3 primary hydroxyl groups (preferably from 3 to 8) such as trimethylol propane, trimethylol ethane, pentaerythritol, dipentaerythritol, etc.

The polyester component is made by conventional condensation polymerization procedures well known in the art. The inherent viscosity of the polyester is preferably between about 0.1 and 0.4 as determined at 23° C. using 0.5 gram of polymer per 100 ml. of a solvent consisting of a 60/40 mixture of phenol/tetrachloroethane. Also, the glass transition temperature should be at least 60° C., preferably at least 65° C.

The crosslinking agents of this invention are well known in the art and many are commercially available. Suitable crosslinking agents include melamine-formaldehyde resins such as butylated melamine-formaldehyde resins such as those sold under the trade names Plaskon 3382, Resimine 879 and Beckamine 1216-S. A preferred crosslinking agent is hexamethoxymethylmelamine. Cymel 300 is suitable for this use and is available from American Cyanamid Company.

To insure that the powder will flow out and form a smooth coating prior to cross-linking, it is desirable to delay the action of the crosslinking agent until a temperature is reached which is appreciably higher than the flow-out temperature. This may be accomplished by use of an acid catalyst such as p-toluenesulfonic acid which can be temporarily deactivated or neutralized by reacting it with a compound containing an oxirane group, i.e.,

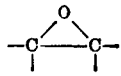

One suitable compound has the formula

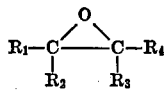

where $R_1$ is alkyl, aryl, or aryloxy from $C_1$–$C_{20}$, and $R_2$, $R_3$, and $R_4$ are each hydrogen, alkyl from $C_1$ to $C_8$ or phenyl. Preferably, the compound is bisphenol A bisglycidyl ether or its low polymers commercially available from Shell Chemical Company under the trade name Epon resins, and $R_2$, $R_3$ and $R_4$ are each hydrogen. Such a catalyst is described in a copending application of Parsons and Sheme filed Feb. 26, 1973, Ser. No. 335,870 said application being assigned to the same assignor as this application.

The temporary deactivation of the acid catalyst is thought to occur through the oxirane group tying up the acid group which can later be freed or reactivated through the application of heat. To produce the temporarily deactivated catalyst, the acid catalyst and the epoxy compound are mixed in about stoichiometric proportions and allowed to stand for a sufficient period of time to assure that a complete reaction has occurred. Once the reaction has occurred the catalyst is in a "neutral" state.

Another type of epoxy compound that is a good source of the oxirane group for use in forming the temporarily deactivated acidic catalyst is sold under the trade name Epoxol 9-5. Obviously, other materials or oils could be used as long as they will furnish an oxirane group for reacting with the acidic catalyst to form the desired reversible, normally neutral catalyst product. Also, substituted oxirane compounds such as ethylene oxide or propylene oxide may be used. A commercially available resin is Epon 812 marketed by Shell Chemical Company.

Although p-toluenesulfonic acid is preferred as the base acid from which the blocked catalyst is to be formed, it should be realized that other aromatic acids which will react properly with an oxirane group and can later be restored to an acidic or active condition by heating for promoting a reaction between the crosslinking agent and polyester could be used. Examples of other acids which can be used are: phenyl acid phosphate, butyl acid phosphate, oxalic acid, benzenesulfonic, and monobutyl acid maleate.

It is desirable to conduct the blocking of the catalyst in a mixture containing an inert ingredient as a solvent in order to limit the rate of the blocking reaction. If the reaction is too vigorous, a great deal of heat is evolved, and, in the absence of solvent, the temperature may reach a point when the oxirane component will either evaporate from the reaction vessel or will polymerize into a gel.

The blocked catalyst does not appear to unblock at temperatures below about 290° F. with any appreciable rate. Oxirane compounds appear to react with p-toluenesulfonic acid to cause the acid to become inactive until such a time as it is heated above about 290° F.

It is believed that an acid, HB, reacts with a compound containing an oxirane structure to form a beta hydroxy ester of the acid. That is, the following reaction occurs which results in the formation of the blocked catalyst:

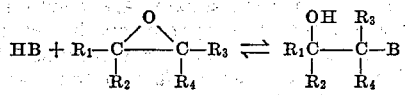

$R_1$, $R_2$, $R_3$, and $R_4$ are as defined hereinbefore. B represents the anion of the acid used for catalysis.

In the specific case of p-toluenesulfonic acid and propylene oxide the reaction is believed to be:

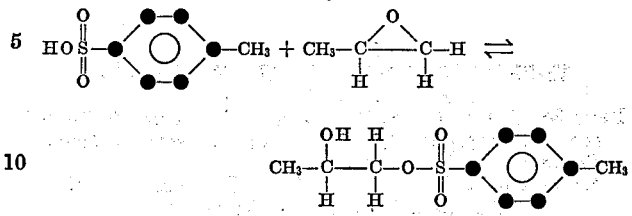

When heated above about 290° F., this reaction is apparently reversed, allowing the free acid to be formed which thus is available to catalyze the crosslinking of the film. It is apparently only at temperatures above about 290° F. that this reverse action occurs rapidly enough to cause the crosslinking reaction to take place rapidly.

It is desirable for the thermosetting powder coating composition of the present invention to also include a cellulose ester such as cellulose acetate butyrate. The preferred cellulose ester has a butyryl content of between about 30 and about 55% by weight, a hydroxyl content of between about 0.1 and about 5% by weight, an acetyl of about 1 to 15%, (measured as a percentage of the total weight of one anhydroglucose unit) and a viscosity of from 0.01 to 20 seconds (ASTM D-817-65 Formula A and D-1343-56).

The thermosetting powder coating composition may also contain a suitable plasticizer. The plasticizer must be sufficiently compatible to avoid a sticky formulation. Suitable plasticizers include dioctyl phthalate, dibutyl phthalate, butyl benzyl phthalate, 2,2,4-trimethylpentanediol-1,3-monoisobutyrate monobenzoate, trioctyl trimellitate, an ester derived from neopentyl glycol and adipic acid, or the like.

Conventional stabilizers, such as Irganox 1093, a product of Ciba-Geigy, may be used in small amounts to prevent discoloration, etc. Also, conventional dyes or pigments such as R-100 titanium dioxide pigment marketed by Du Pont may be used.

The components of the powder coating compositions according to this invention may be mixed by dry blending in a mixer or blender (e.g., a Waring Blender), followed by compounding in a Brabender Extruder (¾") at 115°–130° C. and 50–100 r.p.m., granulating, cryogenically grinding and then screening to obtain a 150 mesh powder for coating. Also, the polyester and cellulose ester, pigment and stabilizer, if used, may be extruded at about 200° C., then mixed with the crosslinking agent, catalyst, and plasticizer (if used) in a Banbury mixer, a combination of a Banbury mixer and roll mill, a roll mill alone or an extruder at a temperature of between about 100° C. and 150° C. Alternately, all the components may be dissolved in a solvent such as methylene chloride (at about 20 weight percent solids) and spray dried at a chamber temperature of about 50° C. by well-known techniques.

The powdered composition may be deposited on the substrate by use of a powder gun, by electrostatic deposition or by deposition from a fluidized bed or by other well-known methods of powder deposition. After deposition the powder is heated to a temperature sufficient to cause its particles to flow and thus fuse together to form a smooth, uniform, continuous, uncratered coating on the substrate surface. Normally, temperatures of around 350° F.-375° F. are required for curing.

The following examples are submitted for a better understanding of the invention.

In the examples, the physical properties of the coatings are determined as follows:

Appearance Rating

In order to obtain appearance as a numerical value for identification, the following rating system for "orange peel" appearance and crater evaluation is used:

| | |
|---|---|
| 8–None | 3–Moderate |
| 7–Trace | 2–Moderate to heavy |
| 6–Very slight | 1–Heavy |
| 5–Slight | 0–Very heavy |
| 4–Slight to moderate | |

Adhesion Tape Test

Seven horizontal score lines about 7/16 inch apart are crossed with seven vertical score lines about 1/16 inch apart using a sharp razor blade to cut through the coating to the metal. Pressure sensitive tape (Scotch) is pressed down firmly over the cross-hatched pattern and pulled off rapidly. A complete failure is recorded when the coating is completely peeled off. A partial failure is noted when 5 squares or more are lifted and a slight failure is identified when less than five squares are lifted. When the coating is brittle, as may occur from degradation, it does not have the cohesive strength to peel, and hence splits next to the score line giving an apparent appearance of good adhesion since the bulk of the coating is not removed. It is necessary to examine the tape and the coating for signs of such behavior being due to brittleness and not adhesion.

Acetone Resistance

The softening of the coating caused by acetone being applied to the surface is determined.

Caking at 80° F.

Samples of 3–5 grams are placed in a container and allowed to age for a selected time (usually 48 hours) at the indicated temperature. The samples are then inverted and inspected visually for caking.

Impact Strength

Impact strength is determined by using a Gardner Laboratory, Inc., Impact Tester. A weight is dropped within a slide tube from a specified height to hit a punch having a 5/8 inch diameter hemispherical nose which is driven into the front (coated face) or back of the panel. The highest impact which does not crack the coating is recorded in inch-pounds, front and reverse.

Flexibility

The test panel is bent over a period of 15 seconds, using a Gardner Laboratory, Inc., conical mandrel of specified size, according to ASTM D–522. A pass or fail is recorded.

Gloss

Twenty degree and sixty degree gloss are measured using a gloss meter (Gardner Laboratory, Inc., Model GC–9095) according to ASTM D–523.

Pencil Hardness

The pencil hardness of a coating is that of the hardest pencil that will not cut into the coating. The procedure for preparing the truncated cone pencil lead and carrying out the test is given in the National Coil Coaters Association Technical Bulletin No. II (Aug. 12, 1968). Results are expressed according to the following scale:

(softest) 6B, 5B, 4B, 3B, 2B, B, HB, F, H, 2H, 3H, 4H, 5H, 6H (hardest)

Weatherability

The loss of gloss, change in impact strength, and flexibility are determined following a specified time of being subjected to artificial weather conditions.

Coating Thickness

The coating thickness is determined using a General Electric Thickness Gauge, Type B.

Fusion of the Coating

Test panels are placed in a Freas Model 625A forced air oven and fused at a specified temperature for a specified time. The fused coatings are then hung on a bar to cool at room temperature.

In Examples 1 through 21, polyesters are prepared by conventional techniques from dimethyl terephthalate, neopentyl glycol and varying levels of trimethylolpropane and inherent viscosities, a specific example of which is as follows:

Into a 1000-ml. flask are placed 400 g. of the polyester (I.V. about 0.7) and the desired amount (1–10 mole percent) of the triol. After the flask is equipped with a stirrer and provision for maintaining a nitrogen atmosphere, it is then immersed in a metal heating bath which is maintained at 225° C. for 3–4 hours. During this period, the contents of the flask, under nitrogen, are stirred continuously, slowly at first and more rapidly later as the glycolysis reaction occurs and the melt viscosity of the polyester decreases. The hydroxylated polyester has an inherent viscosity of about 0.2–0.3, depending on the amount of triol added. Inherent viscosities are determined at a concentration of 0.5 g./100 ml. in 60/40 phenol/tetrachloroethane at 23° C.

The polyesters so prepared are mixed with 10 phr. crosslinking agent (hexamethoxymethylmelamine), 5 phr. Ko-

TABLE I

| Example | Percent polyol | I.V. | Fusion temp. °F., for 10 min. | Thickness, mil. | Appearance rating Orange peel | Crater | Adhesion tape test | Impact strength in.-lb. Front | Reverse | Flexibility 1/8" conical mandrel | Gloss 20° | 60° | Pencil hardness | Caking at room temperature |
|---|---|---|---|---|---|---|---|---|---|---|---|---|---|---|
| 1 | 5 | 0.29 | 325 | 1.3 | 6 | 8 | Fail | 20 | <10 | Fail | 29 | 70 | | None. |
| 2 | 5 | 0.29 | 350 | 1.4 | 6 | 8 | Pass | 120 | 50 | Pass | 24 | 58 | | Do. |
| 3 | 5 | 0.29 | 375 | 1.3 | 6 | 8 | do | >160 | >160 | do | 31 | 78 | H | Do. |
| 4 | 5 | 0.29 | 400 | 1.3 | 6 | 8 | do | >160 | >160 | do | 32 | 76 | | Do. |
| 5 | 5 | 0.29 | 425 | 1.1 | 6 | 8 | do | >160 | >160 | do | 31 | 76 | H | Do. |
| 6 | 5 | 0.29 | 450 | 1.0 | 6 | 8 | do | 100 | 40 | do | 24 | 70 | | Do. |
| 7 | 5 | 0.29 | 475 | 0.8 | 6 Slight yellowing | 8 | Fail | 40 | <10 | Fail | 16 | 60 | | Do. |
| 8 | 2.5 | 0.26 | 325 | 1.3 | 6 | 8 | do | 20 | <10 | do | 42 | 77 | | |
| 9 | 2.5 | 0.26 | 350 | 1.3 | 6 | 8 | Pass | 120 | 40 | Pass | 27 | 65 | | |
| 10 | 2.5 | 0.26 | 375 | 1.1 | 6 | 8 | do | >160 | >160 | do | 32 | 74 | H | Do. |
| 11 | 2.5 | 0.26 | 400 | 1.1 | 6 | 8 | do | >160 | >160 | do | 29 | 72 | | |
| 12 | 2.5 | 0.26 | 425 | 0.7 | 6 | 8 | do | >160 | >160 | do | 31 | 76 | H | |
| 13 | 2.5 | 0.26 | 450 | 1.0 | 6 | 8 | do | 160 | 90 | do | 34 | 77 | | |
| 14 | 2.5 | 0.26 | 475 | 0.9 | 6 Slight yellowing | 8 | Fail | 30 | <10 | do | 30 | 75 | | |
| 15 | 10 | 0.28 | 325 | 1.4 | 6 | 8 | do | 30 | <10 | Fail | 35 | 81 | | None to very slight. |
| 16 | 10 | 0.28 | 350 | 1.3 | 6 | 8 | Pass | 40 | 10 | Pass | 25 | 67 | | Do. |
| 17 | 10 | 0.28 | 375 | 1.4 | 6 | 8 | do | >160 | >160 | do | 30 | 77 | H | Do. |
| 18 | 10 | 0.28 | 400 | 1.4 | 6 | 8 | do | >160 | >160 | do | 30 | 76 | | Do. |
| 19 | 10 | 0.28 | 425 | 1.2 | 6 | 8 | do | >160 | >160 | do | 30 | 76 | H | Do. |
| 20 | 10 | 0.28 | 450 | 1.0 | 6 | 8 | do | 90 | 20 | do | 23 | 70 | | Do. |
| 21 | 10 | 0.28 | 475 | 0.8 | 6 Slight yellowing | 8 | Fail | 40 | >10 | Fail | 19 | 63 | | Do. | daflex NP-10 (an alcohol terminated polyester of neopentyl glycol and adipic acid marketed by Eastman Chemical Products, Inc., 10 phr. cellulose acetate butyrate "EAB 551-0.2" having a viscosity of 0.15-0.30 seconds as measured by ASTM D-817-65 (Formula A) and D-1343-56, an acetyl content of about 2% by weight, a butyryl content of about 53% by weight and a hydroxyl content of about 1.6% by weight, and 40 phr. R-100 $TiO_2$ pigment. The catalyst is prepared from 1 part of a 1:1 solution of p-toluenesulfonic acid and n-butanol and 4 parts Epon 812, a glycerol epichlorohydrin type epoxy resin sold by Shell Chemical Company, or a bisphenol A epichlorohydrin type epoxy resin and is used in an amount of 1.5 phr. The components are prepared by dry blending in a Waring Blender followed by compounding in a Brabender Extruder (115° C.-130° C. and 50-100 r.p.m.), granulating, cryogenically grinding and then screening to obtain a 150 mesh powder for electrostatic spray onto steel test panels. After the coatings are applied to test panels, the coatings are heated at the indicated temperatures for 10 minutes. The results are given in Table I containing Examples 1 through 21.

In the Examples 22 through 42, compositions are prepared as in Examples 1 through 21, except the concentration of crosslinking agent (hexamethoxymethylmelamine) is varied, the level of trimethylolpropane is held at 10% and no catalyst is used. The thickness of the coatings is between 1.0 and 1.4 mil. The results are given in Table II.

TABLE II

| Example | Cross-linking agent, phr. | I.V. | Fusion temp., °F., for 10 min. | Appearance rating Orange peel | Crater | Adhesion tape test | Impact strength in.-lb. Front | Reverse | Flexibility ⅛" conical mandrel | Gloss 20° | 60° | Pencil hardness | Caking at room temperature |
|---|---|---|---|---|---|---|---|---|---|---|---|---|---|
| 22 | 7.5 | 0.28 | 325 | 6 | 6 | Fail | 30 | <10 | Fail | 20 | 64 | | |
| 23 | 7.5 | 0.28 | 350 | 6 | 6 | do | 30 | <10 | do | 19 | 62 | | |
| 24 | 7.5 | 0.28 | 375 | 6 | 6 | Pass | 30 | <10 | do | 9 | 60 | | None |
| 25 | 7.5 | 0.28 | 400 | 6 | 7 | do | 40 | <10 | do | 17 | 59 | | |
| 26 | 7.5 | 0.28 | 425 | 6 | 7 | do | 40 | <10 | Pass | 18 | 61 | | |
| 27 | 7.5 | 0.28 | 450 | 6 | 7 | do | 80 | 20 | do | 16 | 57 | F | |
| 28 | 7.5 | 0.28 | 475 | 6 | 7 | do | >160 | >160 | do | 15 | 56 | F | |
| 29 | 10 | 0.28 | 325 | 6 | 7 | Fail | 30 | <10 | Fail | 37 | 82 | | |
| 30 | 10 | 0.28 | 350 | 6 | 7 | do | 30 | <10 | do | 35 | 79 | | |
| 31 | 10 | 0.28 | 375 | 6 | 7 | Pass | 50 | <10 | do | 31 | 75 | | Do. |
| 32 | 10 | 0.28 | 400 | 6 | 7 | do | 40 | <10 | do | 24 | 71 | | |
| 33 | 10 | 0.28 | 425 | 6 | 7 | do | 40 | <10 | Pass | 23 | 68 | | |
| 34 | 10 | 0.28 | 450 | 6 | 7 | do | 70 | 40 | do | 22 | 68 | F | |
| 35 | 10 | 0.28 | 475 | 6 | 7 | do | >160 | >160 | do | 21 | 65 | F | |
| 36 | 12.5 | 0.28 | 325 | 7 | 7 | Fail | 20 | <10 | Fail | 48 | 87 | | |
| 37 | 12.5 | 0.28 | 350 | 7 | 7 | do | 20 | <10 | do | 39 | 80 | | |
| 38 | 12.5 | 0.28 | 375 | 6 | 7 | Pass | 40 | <10 | do | 32 | 75 | | Very slight. |
| 39 | 12.5 | 0.28 | 400 | 6 | 7 | do | 40 | <10 | do | 27 | 73 | | |
| 40 | 12.5 | 0.28 | 425 | 6 | 7 | do | 40 | 10 | Pass | 25 | 70 | | |
| 41 | 12.5 | 0.28 | 450 | 6 | 7 | do | 90 | 90 | do | 23 | 69 | H | |
| 42 | 12.5 | 0.28 | 475 | 6 | 7 | do | >160 | >160 | do | 22 | 68 | F | |

In the following Examples 43 through 70, compositions are prepared as in Examples 1 through 21, holding the concentration of crosslinking agent (hexamethoxymethylmelamine) at 10 phr. and the level of trimethylolpropane at 10%, but varying the concentration of the catalyst. The results are given in Table III containing Examples 43 through 70.

TABLE III

| Example | Catalyst, phr. | I.V. | Fusion temp., °F., for 10 min. | Thickness, mil. | Appearance rating Orange peel | Crater | Adhesion tape test | Impact strength in.-lb. Front | Reverse | Flexibility ⅛" conical mandrel | Gloss 20° | 60° | Pencil hardness | Caking at room temperature |
|---|---|---|---|---|---|---|---|---|---|---|---|---|---|---|
| 43 | 0 | 0.28 | 325 | 1.3 | 6 | 7 | Fail | 20 | <10 | Fail | 34 | 75 | | |
| 44 | 0 | 0.28 | 350 | 1.0 | 6 | 7 | do | 30 | <10 | do | 29 | 72 | | |
| 45 | 0 | 0.28 | 375 | 1.0 | 6 | 7 | Pass | 50 | <10 | do | 29 | 69 | H | None. |
| 46 | 0 | 0.28 | 400 | 0.9 | 6 | 7 | do | 50 | <10 | Pass | 18 | 59 | | |
| 47 | 0 | 0.28 | 425 | 0.9 | 6 | 7 | do | >160 | 140 | do | 12 | 50 | H | |
| 48 | 0 | 0.28 | 450 | 1.0 | 6 | 7 | do | >160 | >160 | do | 13 | 54 | | |
| 49 | 0 | 0.28 | 475 | 0.8 | 6 Slight yellowing | 7 | do | 140 | 60 | do | 11 | 47 | | |
| 50 | 0.75 | 0.28 | 325 | 1.2 | 6 | 7 | Fail | 20 | <10 | Fail | 35 | 78 | | |
| 51 | 0.75 | 0.28 | 350 | 1.4 | 6 | 7 | Pass | 40 | <10 | Pass | 25 | 70 | | |
| 52 | 0.75 | 0.28 | 375 | 1.4 | 6 | 8 | do | >160 | >160 | do | 26 | 70 | H | Do. |
| 53 | 0.75 | 0.28 | 400 | 1.0 | 6 | 7 | do | >160 | >160 | do | 25 | 71 | | |
| 54 | 0.75 | 0.28 | 425 | 1.0 | 6 | 8 | do | >160 | >160 | do | 25 | 71 | H | |
| 55 | 0.75 | 0.28 | 450 | 1.0 | 6 | 7 | do | >160 | 110 | do | 24 | 71 | | |
| 56 | 0.75 | 0.28 | 475 | 0.9 | 6 Slight yellowing | 7 | Fail | 80 | 10 | Fail | 22 | 69 | | |
| 57 | 1.5 | 0.28 | 325 | 1.4 | 6 | 8 | do | 30 | <10 | do | 35 | 81 | | |
| 58 | 1.5 | 0.28 | 350 | 1.3 | 6 | 8 | Pass | 40 | 10 | Pass | 25 | 67 | | |
| 59 | 1.5 | 0.28 | 375 | 1.4 | 6 | 8 | do | >160 | >160 | do | 30 | 77 | H | Very slight. |
| 60 | 1.5 | 0.28 | 400 | 1.4 | 6 | 8 | do | >160 | >160 | do | 30 | 76 | | |
| 61 | 1.5 | 0.28 | 425 | 1.2 | 6 | 8 | do | >160 | >160 | do | 30 | 76 | H | |
| 62 | 1.5 | 0.28 | 450 | 1.0 | 6 | 8 | do | 90 | 20 | do | 23 | 70 | | |
| 63 | 1.5 | 0.28 | 475 | 0.8 | 6 Slight yellowing | 7 | Fail | 40 | <10 | Fail | 19 | 63 | | |
| 64 | 3.0 | 0.28 | 325 | 1.7 | 6 | 8 | Pass | 40 | <10 | do | 25 | 68 | | |
| 65 | 3.0 | 0.28 | 350 | 1.3 | 6 | 8 | do | >160 | >160 | Pass | 17 | 55 | | |
| 66 | 3.0 | 0.28 | 375 | 1.4 | 6 | 8 | do | >160 | >160 | do | 25 | 70 | H | Slight. |
| 67 | 3.0 | 0.28 | 400 | 1.4 | 6 | 8 | do | >160 | >160 | do | 22 | 69 | | |
| 68 | 3.0 | 0.28 | 425 | 1.5 | 6 | 8 | do | >160 | >160 | do | 21 | 64 | | |
| 69 | 3.0 | 0.28 | 450 | 1.2 | 6 | 8 | do | 50 | <10 | do | 17 | 62 | H | |
| 70 | 3.0 | 0.28 | 475 | 1.1 | 6 Slight yellowing | 8 | Fail | 50 | <10 | Fail | 12 | 50 | | |

In the following Examples 71 through 82, compositions are prepared as in Examples 1 through 21, holding the concentrations of crosslinking agent (hexamethoxymethylmelamine) at 10 phr., the level of trimethylolpropane at 10%, no curing catalyst, but varying the concentration of cellulose acetate butyrate (EAB 551-0.2). The results are given in Table IV containing Examples 71 through 82. Five phr. plasticizer (ester of neopentyl glycol and adipic acid) are used in each of these examples.

TABLE IV

| Example | Cellulose acetate butyrate level phr. | Fusion temp., °F., for 10 min. | Thickness, mil. | Appearance rating Orange peel | Crater | Adhesion tape test | Impact strength in.-lb. Front | Reverse | Flexibility ⅛″ conical mandrel | Gloss 20° | 60° | Pencil hardness | Caking at room temperature |
|---|---|---|---|---|---|---|---|---|---|---|---|---|---|
| 71 | 0 | 425 | 1.3 | 6 | 3 | Pass | 40 | <10 | Pass | 40 | 84 | | |
| 72 | 0 | 450 | 1.1 | 6 | 3 | do | >160 | 110 | do | 27 | 72 | | Moderate. |
| 73 | 0 | 475 | 1.0 | 6 | 3 | do | >160 | >160 | do | 30 | 73 | F | |
| 74 | 5 | 425 | 1.2 | 6 | 7 | do | 30 | <10 | do | 32 | 79 | | |
| 75 | 5 | 450 | 1.3 | 6 | 7 | do | 80 | 40 | do | 25 | 71 | | Very slight. |
| 76 | 5 | 475 | 1.1 | 6 | 7 | do | >160 | >160 | do | 23 | 61 | F | |
| 77 | 10 | 425 | 1.3 | 6 | 8 | do | 40 | <10 | do | 28 | 72 | | |
| 78 | 10 | 450 | 1.1 | 6 | 8 | do | 60 | 30 | do | 22 | 65 | | None. |
| 79 | 10 | 475 | 1.2 | 6 | 8 | do | >160 | >160 | do | 21 | 61 | F | |
| 80 | 20 | 425 | 1.4 | 7 | 8 | do | 30 | <10 | Fail | 48 | 81 | | |
| 81 | 20 | 450 | 1.5 | 7 | 8 | do | 90 | 40 | Pass | 41 | 82 | | Do. |
| 82 | 20 | 475 | 1.5 | 7 | 8 | do | 120 | 50 | do | 37 | 72 | F | |

The following Table V illustrates the physical properties of a preferred formulation containing (a) a polyester derived from terephthalic acid, neopentyl glycol, 5% trimethylolpropane having an I.V. of 0.29, (b) 7.5 phr. crosslinking agent (hexamethoxymethylmelamine), (c) 1 phr. catalyst as defined above, (d) 5 phr. Kodaflex NP–10 plasticizer, (e) 10 phr. cellulose acetate butyrate as defined above, (f) 0.5 phr. Irganox 1093 stabilizer and 50 phr. R–100 TiO₂ pigment. The composition is of a size of 150 mesh and is coated on a bonderized steel plate using an electrostatic spray gun. When about 2% pentaerythritol is substituted for the 5% trimethylolpropane, and about the same amount of hexabutoxymethylmelamine is substituted for the hexamethoxymethylmelamine, similar results are obtained in Examples 83–95.

trations, therefore, of between about 0.1 phr. and about 3 phr. may be used, with about 1.5 phr. being preferred. The results illustrate the effects of poor crosslinking at temperatures below about 350° F., as well as adverse effects above about 450° F.

Cellulose esters, particularly cellulose acetate butyrate, are desirable components of the composition as they reduce caking tendencies and improve the ability of the powder coating to flow out when subjected to heat and become smooth. Concentrations of up to 20 phr. of cellulose acetate butyrate are desirable, while above about 20 phr., there is a tendency for the cellulose acetate butyrate to become incompatible with the polyester. A concentration of about 10 phr. cellulose acetate butyrate as defined herein is preferred.

TABLE V

| Example | Fusion temp., °F., for 10 min. | Thickness, mil. | Appearance rating Orange peel | Crater | Adhesion tape test | Impact strength in.-lb. Front | Reverse | Flexibility ⅛″ conical mandrel | Gloss 20° | 60° | Pencil hardness | Acetone resistance |
|---|---|---|---|---|---|---|---|---|---|---|---|---|
| 83 | 325 | 1.3 | 6 | 8 | Fail | 30 | <10 | Fail | 16 | 54 | F | Poor. |
| 84 | 350 | 1.1 | 6 | 8 | Pass | 50 | <10 | Pass | 12 | 45 | | |
| 85 | 375 | 1.0 | 6 | 8 | do | >160 | >160 | do | 13 | 50 | H | Good. |
| 86 | 400 | 1.0 | 6 | 8 | do | >160 | >160 | do | 18 | 58 | | |
| 87 | 425 | 1.1 | 6 | 8 | do | >160 | >160 | do | 18 | 61 | | |
| 88 | 450 | 1.1 | 6 | 8 | do | >160 | >160 | do | 23 | 63 | H | Do. |
| 89 | 475 | 1.1 | Very slight yellowing | | do | 90 | 10 | do | 21 | 63 | | |
| 90 | 375 | 0.8 | Incomplete covering | 4 | do | >160 | >160 | do | 2 | 20 | | |
| 91 | 375 | 1.2 | 6 | 8 | do | >160 | >160 | do | 15 | 56 | | |
| 92 | 375 | 1.5 | 6 | 8 | do | >160 | >160 | do | 18 | 61 | | |
| 93 | 375 | 2.4 | 7 | 8 | do | >160 | >160 | do | 10 | 46 | | |
| 94 | 375 | 3.6 | Textured | 8 | do | >160 | >160 | do | 1 | 19 | | |
| 95 | 375 | 5.5 | Textured | 8 | do | >160 | 110 | do | 2 | 21 | | |

The results illustrated in the examples indicate that the polyester component of the formulation should contain the lowest level of polyol modification possible without loss of coating properties, as increasing the polyol content above about 10 mole percent increases the caking tendency of the composition. Between about 2 mole percent and about 10 mole percent of the polyol should be used with about 5 mole percent being preferred. Below about 2 mole percent, insufficient crosslinking occurs. Also, the results indicate that the concentration of the crosslinking agent should be maintained between about 2 phr. and about 10 phr., with about 7.5 phr. being preferred, when the level is increased above about 10 phr., the tendency for the powder to cake increases. Caking of the powder cannot be tolerated because of application difficulties as well as coating thickness considerations.

Tables II and IV illustrate caking tendencies and also show that a formulation containing no curing catalyst requires a curing temperature of greater than 400° F. for 10 minutes to obtain good impact strength and flexibility. Excessively high curing temperatures are often undesirable as some substrates cannot withstand these heating conditions and more energy is required. The formulations containing the catalyst have adequate curing at about 350–375° F. for 10 minutes, and still the coating flows out to form a smooth coating prior to crosslinking. Compositions containing above about 3 phr. catalyst have a tendency to cake at room temperature. Catalyst concen- Conventional ester plasticizers in concentrations up to about 10 phr. are desirable in the composition, although not essential. Plasticizers act as a flow aid in the composition, but above about 10 phr., the powder composition tends to cake and have low reverse impact strength.

In Table VI which follows, Examples 83–88 illustrate powder coating compositions comprising a polyester derived from neopentyl glycol, 5 mole percent trimethylolpropane, terephthalic acid, and 10 mole percent isophthalic acid, 25 phr. crosslinking agent (hexamethoxymethylmelamine), 1.0 phr. catalyst as described for Examples 1–21, 10 phr. cellulose acetate butyrate (EAB 551–0.2), 5 phr. plasticizer (Kodaflex NP–10), 0.5 phr. Irganox 1093 stabilizer, and 50 phr. R–100 TiO₂. The polyester has an I.V. of 0.29 and a glass transition temperature of 68° C.

Examples 89–94 illustrate powder coating compositions comprising a polyester, 10 phr. crosslinking agent (hexamethoxymethylmelamine), 1.5 phr. catalyst, 10 phr. cellulose acetate butyrate, 5 phr. plasticizer (Kodaflex NP–10), 0.5 phr. Irganox 1093 and 40 phr. TiO₂. The polyester is derived from terephthalic acid, 50 mole percent ethylene glycol and 50 mole percent neopentyl glycol modified with 5 mole percent trimethylolpropane. It has an I.V. of 0.20 and a glass transition temperature of 65° C. Examples 95–99 illustrate powder coating compositions as described for Examples 89–94, except the polyester is derived from 50 mole percent terephthalic acid, 50 mole percent isopthalic acid and ethylene glycol modified with 5 mole percent trimethylolpropane.

cyclohexanedimethanol modified with 5% trimethylolpropane, having an I.V. of 0.36.

TABLE VI

| Example | Exposure time in weather-ometer hours | Fusion temp., °F. 10 minutes | Thickness, mils. | Appearance rating | | Impact strength in.-lb. | | Flexibility 1/8″ conical mandrel | Adhesion, scotch tape |
|---|---|---|---|---|---|---|---|---|---|
| | | | | Orange peel | Crater | Front | Reverse | | |
| 83 | 0 | 400 | 1.7 | 6 | 8 | >160 | >160 | Pass | Pass. |
| 84 | 100 | 400 | 1.4 | 6 | 8 | 120 | 60 | do | Do. |
| 85 | 300 | 400 | 1.6 | 6 | 8 | 80 | 20 | do | Do. |
| 86 | 500 | 400 | 1.7 | 6 | 8 | 80 | 40 | do | Do. |
| 87 | 750 | 400 | 1.7 | 6 | 8 | 60 | <10 | do | Do. |
| 88 | 1,000 | 400 | 1.6 | 6 | 8 | 40 | <10 | Fail | Do. |
| 89 | 0 | 400 | 1.1 | 6 | 8 | >160 | >160 | Pass | Do. |
| 90 | 100 | 400 | 1.2 | 6 | 8 | 120 | 120 | do | Do. |
| 91 | 300 | 400 | 1.1 | 6 | 8 | 100 | 40 | do | Do. |
| 92 | 500 | 400 | 1.2 | 6 | 8 | 80 | 10 | do | Do. |
| 93 | 750 | 400 | 1.3 | 6 | 8 | 70 | <10 | do | Do. |
| 94 | 1,000 | 400 | 1.2 | 6 | 8 | 70 | <10 | Fail | Do. |
| 95 | 0 | 400 | 1.7 | 6 | 8 | 130 | 80 | Pass | Do. |
| 96 | 300 | 400 | 1.6 | 6 | 8 | 50 | <10 | Fail | Do. |
| 97 | 500 | 400 | 1.6 | 6 | 8 | 40 | <10 | do | Do. |
| 98 | 750 | 400 | 1.7 | 6 | 8 | 30 | <10 | do | Do. |
| 99 | 1,000 | 400 | 1.6 | 6 | 8 | 40 | <10 | do | Do. |

The above Table VI illustrates the effect on impact strength and flexibility after being subjected to weatherability tests, where a mixture of 50 mole percent ethylene glycol and 50 mole percent neopentyl glycol are used in the polyester of Examples 89–94, and where the glycol component is entirely ethylene glycol in Examples 95–99. There is a marked decrease in impact strength and flexibility shown in Examples 95–99.

The weather testing instrument used is described as: Atlas Weather-Ometer, Model 600WRC, Serial No. XE:343: light source; xenon burner, 6000 watts; black panel temperature=145° F.; dry bulb temperature= 113° F., relative humidity=65%; spray cycle=9 min. wet, 51 min. dry.

In Table VII which follows, each of the examples contains a polyester, 7.5–10 phr. crosslinking agent, 1.0–1.5 phr. catalyst, 10 phr. cellulose acetate butyrate, 5 phr. plasticizer, 0.5 phr. Irganox 1093 and 40–50 phr. TiO$_2$. In Examples 100 through 104, the polyester is derived from terephthalic acid and neopentyl glycol modified with 5 mole percent trimethylolpropane, has an I.V. of 0.29 and a glass transition temperature of 68° C. In Examples 105 through 109, the polyester is derived from terephthalic acid, 50 mole percent ethylene glycol, 50 mole percent neopentyl glycol and 5 mole percent trimethylolpropane, has an I.V. of 0.20 and a glass transition temperature of 65° C. In Examples 110 through 114, the polyester is derived from terephthalic acid, isophthalic acid and ethylene glycol, modified with 5% trimethylolpropane, having an I.V. of 0.21 and a glass transition temperature of 61° C. In Examples 115 through 119, the polyester is derived from terephthalic acid, 50 mole percent ethylene glycol and 50 mole percent 1,4-cyclohexanedimethanol modified with 5% trimethylolpropane, having an I.V. of 0.24 and a glass transition temperature of 63° C. In Examples 120 through 124 the polyester is derived from 67% terephthalic acid, 33% isophthalic acid, and 1,4-cyclohexanedimethanol modified with 5% trimethylolpropane, and having an I.V. of 0.34 and a glass transition temperature of 72° C. In Examples 125 through 129, the polyester is derived from 60 mole percent terephthalic acid, 40 mole percent isophthalic acid and 1,4-

TABLE VII

| Example | Fusion temp., °F., 10 minutes | Thickness, mils. | Gardner gloss | | Appearance rating | |
|---|---|---|---|---|---|---|
| | | | 20° | 60° | Orange peel | Crater |
| 100 | 350 | 1.8 | 24 | 58 | 6 | 8 |
| 101 | 375 | 1.3 | 31 | 78 | 6 | 8 |
| 102 | 400 | 1.3 | 32 | 76 | 6 | 8 |
| 103 | 425 | 1.1 | 31 | 76 | 6 | 8 |
| 104 | 450 | 1.0 | 24 | 70 | 6 | 8 |
| 105 | 350 | 0.9 | 24 | 69 | 6 | 8 |
| 106 | 375 | 0.8 | 22 | 66 | 6 | 8 |
| 107 | 400 | 0.8 | 22 | 65 | 6 | 8 |
| 108 | 425 | 0.9 | 25 | 65 | 6 | 7 |
| 109 | 450 | 0.9 | 25 | 69 | 6 | 7 |
| 110 | 350 | 1.0 | 24 | 60 | 6 | 7 |
| 111 | 375 | 0.9 | 18 | 51 | 6 | 7 |
| 112 | 400 | 1.0 | 22 | 60 | 6 | 7 |
| 113 | 425 | 1.0 | 24 | 63 | 6 | 7 |
| 114 | 450 | 0.9 | 27 | 69 | 6 | 7 |
| 115 | 350 | 1.3 | 0 | 1 | Rough | |
| 116 | 375 | 1.0 | 0 | 3 | Rough | |
| 117 | 400 | 0.9 | 2 | 15 | Rough | |
| 118 | 425 | 0.9 | 5 | 35 | 1 | 8 |
| 119 | 450 | 0.9 | 10 | 46 | 4 | 8 |
| 120 | 350 | 1.5 | 12 | 45 | 7 | 8 |
| 121 | 375 | 1.3 | 13 | 49 | 4 | 8 |
| 122 | 400 | 1.3 | 12 | 46 | 4 | 8 |
| 123 | 425 | 1.3 | 11 | 42 | 4 | 8 |
| 124 | 450 | 1.0 | 13 | 48 | 4 | 8 |
| 125 | 350 | 1.5 | 1 | 10 | Rough | |
| 126 | 375 | 1.3 | 8 | 42 | 5 | 8 |
| 127 | 400 | 1.0 | 8 | 42 | 5 | 8 |
| 128 | 425 | 1.3 | 6 | 35 | 4 | 8 |
| 129 | 450 | 1.9 | 3 | 19 | 4 | 8 |

From the above Table VII containing Examples 100 through 129, it will be noted that polyesters derived from neopentyl glycol have a much better gloss rating and appearance rating than polyesters derived from 1,4-cyclohexanedimethanol.

Considering Tables VI and VII, a comparison is given of powder coating compositions derived from polyester based on neopentyl glycol, modified with a small percentage of polyol, and powder coating composition derived from other glycols also modified with a small percentage of polyol. A comparison of the physical properties of the coatings reveals that powder coating compositions derived from polyester containing at least 50 mole percent neopentyl glycol results in a unique combination of properties not provided by other polyesters.

In Examples 130 through 138, powder coating compositions are prepared using a polyester, 7.5 phr. crosslinking agent, 1.0 phr. catalyst, 10 phr. cellulose acetate butyrate EAB 551-0.2, 5 phr. Kodaflex NP-10, 0.5 phr. Irganox 1093 and 50 phr. R-100 $TiO_2$. The polyester is prepared from terephthalic acid and neopentyl glycol. In Examples 130 through 132, the polyester is modified with 5% glycerin, and in Examples 136 through 138, the polyester is modified with 5% trimethylolpropane. The physical properties of the coatings are shown in Table VIII.

TABLE VIII

| Example | Fusion temp., °F., 10 minutes | Thickness, mils. | Gardner gloss 20° | Gardner gloss 60° | Appearance rating Orange peel | Appearance rating Crater | Impact strength in.-lb. Front | Impact strength in.-lb. Reverse | Flexibility ⅛" Conical mandrel | Pencil hardness | Adhesion Scotch tape | Adhesion Peel | Acetone resistance |
|---|---|---|---|---|---|---|---|---|---|---|---|---|---|
| 130 | 350 | 2.0 | 43 | 78 | 6 | 8 | 20 | 10 | Fail | | Fail | Pass | Poor. |
| 131 | 375 | 1.7 | 22 | 62 | 6 | 8 | >80 | 30 | Pass | F | Pass | do | Fair. |
| 132 | 400 | 1.5 | 23 | 63 | 6 | 8 | >80 | 50 | do | H | do | do | Good. |
| 133 | 350 | 1.3 | 16 | 55 | 7 | 7 | 50 | >10 | Fail | H | do | | Poor. |
| 134 | 375 | 1.0 | 24 | 68 | 7 | 7 | >80 | 50 | Pass | | do | | |
| 135 | 400 | 1.2 | 26 | 71 | 6 | 7 | >80 | 30 | do | H | do | | Fair. |
| 136 | 350 | 1.1 | 12 | 45 | 6 | 8 | 50 | <10 | do | | do | | |
| 137 | 375 | 1.0 | 13 | 50 | 6 | 8 | >160 | >160 | do | H | do | | Good. |
| 138 | 400 | 1.0 | 18 | 58 | 6 | 8 | >160 | >160 | do | | do | | |

It will be seen from Table VIII that the coatings prepared from compositions containing the polyols having only primary hydroxyl groups, e.g., trimethylolpropane, have significantly superior properties to those containing the secondary hydroxyl groups, e.g., glycerin. Examples 133–135 illustrate the effects of the polyester containing no polyol modification.

Unless otherwise specified, all parts, percentages, ratios, etc., are on a weight basis. The term "phr." is a conventional term in the art meaning parts per hundred parts resin, where resin referred to herein is the polyester. Also, use of the term "acid" herein is intended to include anhydrides where the acid has an anhydride.

Although the invention has been described in considerable detail with particular reference to certain preferred embodiments thereof, variations and modifications can be effected within the spirit and scope of the invention.

We claim:

1. A thermosetting coating composition in the form of a powder having an average particle size range of from about 10 to about 300 microns comprising
   (a) a polyester derived from a dicarboxylic acid component, at least 50 mole percent of which is terephthalic acid or isophthalic acid, a glycol component, at least 50 mole percent of which is neopentyl glycol, and from about 2 to about 10 mole percent of a polyol containing from 4 to 16 carbon atoms and having at least 3 primary hydroxyl groups,
   (b) from about 2 to 15 phr. by weight of a melamine cross-linking agent, and
   (c) from about 0.1 phr. to about 3.0 phr. by weight of the reaction product of an acid and a compound containing oxirane groups,
said polyester being free of appreciable crosslinking.

2. A thermosetting coating composition according to claim 1 wherein the polyester contains at least 90 mole percent isophthalic acid or terephthalic acid and at least 75 mole percent neopentyl glycol.

3. A thermosetting coating composition according to claim 1 wherein the polyester contains between about 4 and 8 mole percent of a polyol having from 4 to 16 carbon atoms and between 3 and 8 primary hydroxyl groups.

4. A thermosetting coating composition according to claim 1 wherein the melamine crosslinking agent is hexaalkoxymethylmelamine wherein the alkoxy group contains from 1 to 20 carbon atoms.

5. A thermosetting coating composition according to claim 1 wherein said reaction product is the reaction product of an aromatic sulfonic acid and a compound containing oxirane groups.

6. A thermosetting coating composition according to claim 1 which comprises from about 5 to about 20 phr. cellulose acetate butyrate based on the weight of said polyester.

7. A thermosetting coating composition according to claim 1 wherein said polyester has an inherent viscosity of between about 0.1 and about 0.4.

8. A thermosetting coating composition according to claim 1 wherein said polyester has a glass transition temperature of at least about 65° C.

9. A thermosetting coating composition according to claim 1 wherein said powder has an average particle size of from about 20 to about 50 microns.

10. A thermosetting coating composition in the form of a powder having an average particle size of between about 10 and about 300 microns comprising
   (a) a polyester derived from a dicarboxylic acid component, at least about 90 mole percent of which is isophthalic or terephthalic acid, a glycol component, at least about 75 mole percent of which is neopentyl glycol, and from about 2 to about 10 mole percent of a polyol containing from 4 to 16 carbon atoms and having at least 3 primary hydroxyl groups, said polyester having an inherent viscosity of from about 0.1 to about 0.4 and a glass transition temperature of at least about 65° C.,
   (b) from about 2 to about 15 phr. by weight of a hexaalkoxymethylmelamine crosslinking agent wherein the alkoxy group contains from 1 to 20 carbon atoms, and
   (c) from about 0.1 phr. to about 3.0 phr. by weight of the reaction product of an aromatic sulfonic acid and a compound containing at least one oxirane group, said polyester being free of appreciable crosslinking.

References Cited
UNITED STATES PATENTS

| | | | |
|---|---|---|---|
| 3,759,854 | 9/1973 | Chang et al. | 260—850 |
| 3,684,565 | 8/1972 | Psencik | 260—850 |
| 3,039,979 | 6/1962 | Carlick et al. | 260—850 |
| 3,265,645 | 8/1966 | Coney et al. | 260—15 |

MELVIN GOLDSTEIN, Primary Examiner

E. WOODBERRY, Assistant Examiner

U.S. Cl. X.R.

117—132 A, B, BF, 161 C, K, 161 LN, 166; 260—850